United States Patent [19]

Ageton

[11] 4,032,754

[45] June 28, 1977

[54] GLOBAL TIME SYSTEM

[76] Inventor: Roy R. Ageton, Conrad, Iowa 50621

[22] Filed: Feb. 23, 1976

[21] Appl. No.: 660,373

[52] U.S. Cl. .......................... 235/78 R; 235/88 R; 58/43; 35/44

[51] Int. Cl.² ..................................... G06C 27/00

[58] Field of Search ............ 235/78 R, 78 G, 78 N, 235/61 A, 61 R, 61 NV, 88 R, 88 N; 35/44; 58/43

[56] References Cited

UNITED STATES PATENTS

| | | | |
|---|---|---|---|
| 379,862 | 3/1888 | Crane | 58/43 X |
| 635,268 | 10/1899 | Osse | 35/44 |
| 1,607,560 | 11/1926 | Pennino | 235/88 |
| 1,832,342 | 11/1931 | Willis | 235/88 X |
| 1,975,100 | 10/1934 | Grant | 35/44 X |
| 2,148,907 | 2/1939 | Kidd | 58/43 |
| 2,919,536 | 1/1960 | Speckinger | 58/43 |
| 3,318,085 | 5/1967 | Shao-tang lee | 58/43 |
| 3,360,196 | 12/1967 | Grega | 235/88 |

Primary Examiner—Ulysses Weldon

Attorney, Agent, or Firm—Henderson, Strom & Sturm

[57] ABSTRACT

A global time system having a first disc divided into twenty-four equal sections, each section being formed by lines extending radially from the center of the first disc. Each line forming the sections representing a line of longitude. Circles are concentrically disposed about the center of the disc and extend outward to the edge of the disc. The circles, representing lines of latitude, cross over each of the twenty-four lines of longitude to form geographic spaces between the lines of longitude and latitude. A time disc is rotatably mounted to the center of the first disc and has twenty-four lines equally spaced from each other on the outside edge. Reference symbols are positioned on the first disc and adjacent to the outside edge of the time disc, with the reference symbol in each of the twenty-four sections. Identification symbols representing a specific geographic location are disposed within the respective geographic space having the proper longitude and latitude of the location.

1 Claim, 2 Drawing Figures

GLOBAL TIME SYSTEM

BACKGROUND OF THE INVENTION

The present invention relates generally to time-indicating devices and particularly to a device for determining the time of another place on the earth from any reference point of which the time is already known.

Over the years, various types of devices have been invented for the determination of time. Some of these devices were adapted to give the time locally, while others would give the time in selected time zones and cities throughout the United States and the world. These devices typically included a dial with specific locations listed in the face of the dial.

However, in order for many of the designs of the latter type, to provide enough reference points to be useful, they were often complicated and difficult to use. This, in part, was brought about by the large amount of writing and figures on the dial. In other instances, where the space on the face was severely limited, only a small number of reference points could be listed without reducing the face to an unreadable display of characters. Thus, the number of locations on the face would in most cases be restricted to the more highly populated and principal areas of the country. In order for the time device to be of general use, this limitation was undesirable, since the listing would not be all inclusive and, many times, the time for a needed geographical location not listed would be needed.

Thus, there is a need for a device which is adapted to give the time of nearly any location on the earth without being unduly confusing.

Many of the prior art devices included a clock movement for moving a pair of hands around a circular face for indicating the time at selected time zones and cities. However, in many instances a time device using a clock movement is not desirable, since the functioning of the time device is dependent upon the proper working of the clock movement. Further, the versatility of the time device is reduced, if the clock movement is electrically operated, since a source of power would be needed to operate the time device. On the other hand, if the clock movement is spring operated, the spring would require periodic winding to prevent the clock mechanism from running down. This generally is not desirable.

Therefore, there is a need for a time device capable of giving the time of any location on the earth without requiring complex mechanical or electrical features.

In some instances, the prior art time devices have not been suitable for use as a teaching aid in education institutions, because of their complexity. Therefore, if a time device were to be adapted to give the time of nearly any location on the earth while still permitting use by school-age children, it certainly would be very valuable in the teaching of the concept of world time and perhaps even geography.

SUMMARY OF THE INVENTION

In accordance with the present invention, the method used in the following device enables one to fine the time of day, on any day, in any place on earth or on the sea or under it, at any time, day or night. There is provided a first disc which is divided into twenty-four equal sections extending radially from the center of the first disc. The lines forming the sections represent lines of longitude on the earth; spaced fifteen degrees apart for each of the twenty-four global time zones. Circles are concentrically disposed about the center of the disc and represent lines of latitude spaced ten degrees apart. Geographic spaces are thereby formed between adjacent lines of longitude and latitude and having a length of 10° latitude and a width of 15° longitude. A time disc is rotatably mounted to the center of the first disc. The outside edge of the time disc has twenty-four lines equally spaced from each other. The lines on each half of the time disc are consecutively numbered from one to twelve for designating the twenty-four hours of a day. Reference symbols are placed on the first disc adjacent to the outside edge of the time disc with one of the reference symbols being in each of the twenty-four sections and representing each of the twenty-four sections of longitude. Identification symbols representing a specific location on the earth are located within the respective geographical space representing the particular latitude and longitude of the location. Identification symbols having a dot in front indicate a location in the Northern Hemisphere while identification symbols having a dot behind them indicate a location in the Southern Hemisphere.

A chart is provided adjacent to the first disc listing specific geographical locations. The chart is set up with various geopgraphic locations falling within the same longitudinal section being grouped together on the chart. Each listing of geographic locations is identified by the same reference symbol that appears on the first disc representing the specific section of longitude.

An object of the present invention is the provision of a global time system for easily determining the time of nearly any location on the earth from a given reference point.

Another object is to provide a global time system which is inexpensive to manufacture, easy to use and does not require any external power sources.

A further object of the present invention is the provision of a global time system which has a minimum number of parts and is suitable for use by school age children.

Other objects, advantages, and novel features of the present invention will become apparent from the following detailed description of the invention when considered in conjunction with the accompanying drawings.

DESCRIPTION OF THE PREFERRED EMBODIMENT

Figures 1, 2:
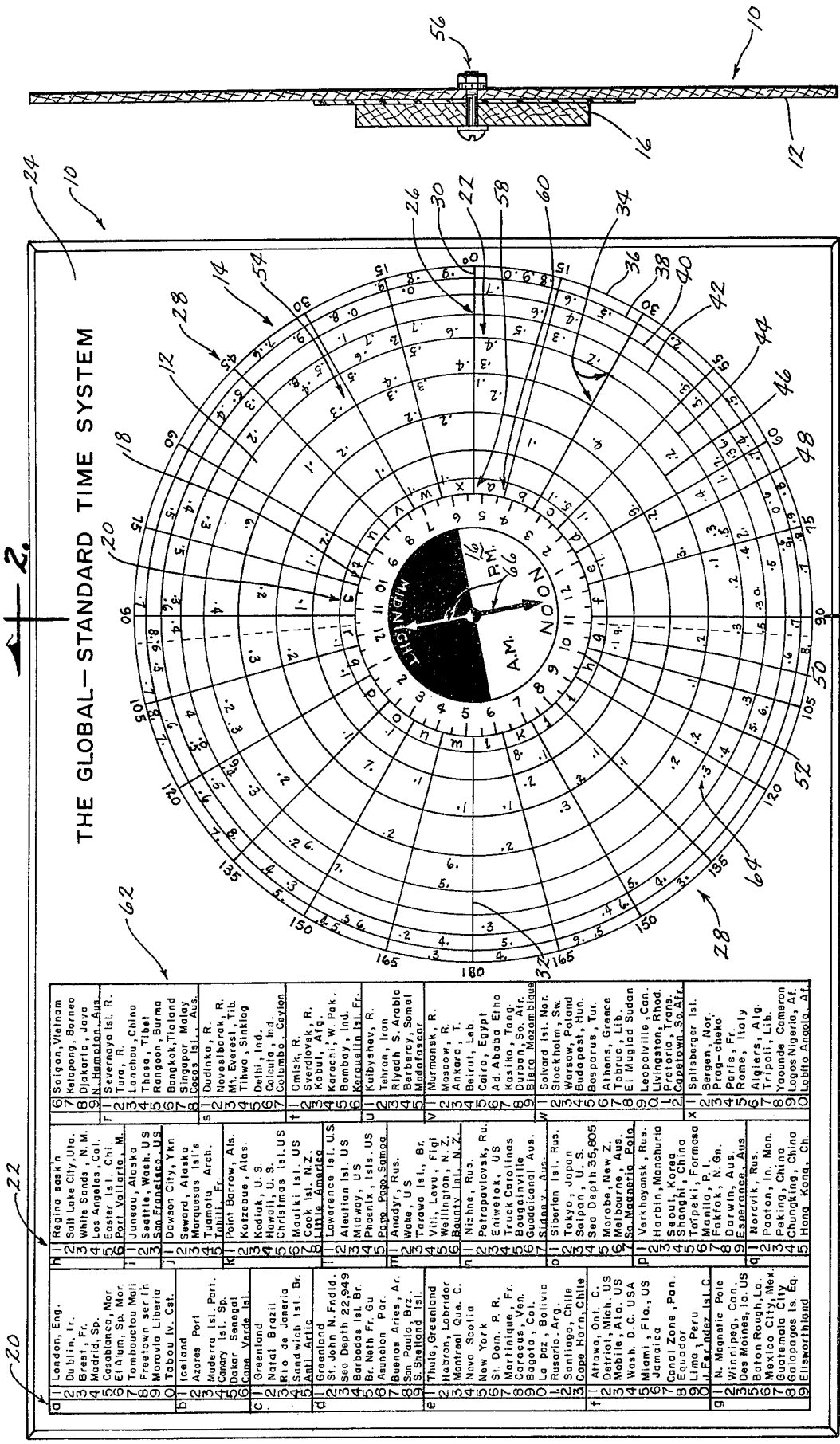
FIG. 1 is a plan view of the global time system.
FIG. 2 is a cross-sectional view thereof taken along lines 2—2 of FIG. 1.

Referring now to the drawings wherein like reference numerals designate identical or corresponding parts throughout the several views, FIG. 1 illustrates the global time system 10 of this invention.

The global time system 10 (FIGS. 1 and 2) includes a first disc 12 divided into twenty-four sections 14, with a time disc 16 rotatably mounted to the center of the first disc 12, also divided into sections 18. Reference symbols 20 are disposed on the first disc 12 and adjacent to the outside edge of the time disc 16. Identification symbols 22 representing specific locations on the earth are disposed on the first disc 12.

Specifically, the first disc 12, as illustrated in FIG. 1, may be drawn on a rectangular shaped cardboard 24 for ease of handling. The sections 14 representing each of the time zones on the earth are equally spaced from each other and formed by lines 26 which extend radially from the center of the first disc 12. The lines 26 represent lines of longitude on the earth having a spacing of fifteen degrees apart. On the outside edge of the first disc 12 are numbers 28 for the actual number of degrees of longitude that each line 26 represents. The numbers 28 start from a zero degree longitude line 30 and extend around the first disc 12 in both directions in fifteen degree multiples, ending directly opposite the 0° longitude line 30, with a line 32 representing 180° longitude.

Circles 34 (FIG. 1) representing lines of latitude are concentrically disposed about the center of the first disc 12. In the embodiment as illustrated in FIG. 1, the circles 34 represent lines of latitude spaced ten degrees apart, with the outside circle 36 representing zero degrees latitude, or the equator. The adjacent circle 38 represents 10° latitude, thus representing ten degrees north of the equator or 10° south of the equator. Likewise, the third circle 40 represents thirty degrees of latitude north and south. In the same manner, circle 42, 44 and 46, respectively, represent north and south lines of latitude of 30°; 40° and 50°; and, circles 48, 50 and 52, respectively, represent the north and south lines of latitude of 60, 70° and 80°. Geographic spacings 54 (FIG. 1) are thereby formed by the lines 26 and circles 34. The geographic spaces have a width equal to 10° latitude and a width of 15° longitude.

The time disc 16 (FIG. 1 and 2) is rotatably mounted at the center of the first disc 12 by a threaded nut and bolt assembly 56. The sections 18 disposed on the edge of the time disc 16 are formed by twenty-four equally spaced lines 58. The lines 58 on each half of the time disc 16 are consecutively numbered from one to twelve for designating the twenty-four hours of a day. Half-hour lines 60 are equally spaced between each pair of the lines 58 for designating time intervals of one half hours.

The inside of the time disc 16 is partially darkened to correspond to evening hours and includes the word "midnight" positioned adjacent to the number twelve, representing twelve o'clock on the darkened portion of the time disc 16. The word "noon" is adjacent to the number twelve, representing twelve o'clock on the light portion of the time disc 16. Further, arrows 66, dividing the time disc 16 into a.m. and p.m. zones, extend outward from the center of the time disc 16 toward the two numbers twelve on the edge of the time disc 16.

The reference symbols 20 (FIG. 1) on the first disc 12 and adjacent to the outside edge of the time disc 16 are disposed in each of the twenty-four longitudinal sections 18. In the preferred embodiment, the first twenty-four letters of the alphabet represent the reference symbols and each represents a different section 14 of longitude. These reference symbols 20 are used in combination with a geographic chart 62, the use of which will be discussed below.

The identification symbols 22 (FIG. 1) represent specific geographic locations, of general interest on the earth. The identification symbols 22 are placed on the first disc 12 within a specific geographical space 54, with the longitude and latitude of the specific location being represented by the specific identification symbol 22 within a geographic space 54 having the same longitude as read from the first disc 12. In the preferred embodiment, the identification symbols 22 are represented by numbers from zero to nine. The identification symbols 22 further include a dot 64 positioned in front or behind the number. The dot 64 actually pin points the specific longitide and latitude of the geographic location on the first disc 12, since the area occupied by the number is large and would reduce the accuracy of the invention 10. Also, if the dot 64 is positioned in front of the identification symbol 22, then the geographic location is north of the equator and if the dot 64 is positioned behind the identification symbol 22, the geographic location is south of the equator.

A geographic chart or library 62 positioned to the left of the first disc 12 is organized by time zones with a listing of selected geographic locations within each time zone. Each time zone listed in the geographical chart 62 is identified by the same reference symbol 20 as appears on the first disc 12. Further, the specific geographic locations appearing beneath the respective time zone reference symbols 20 are referred to using the same identifications symbols 22 that appear on the first disc 12. Therefore, cross-reference between the geographic chart 62 and the first disc 12 is easily accomplished.

With the preceeding details in mind, for example, the time in Bangkok, Thailand will be located when it is approximately 11 o'clock a.m. in Des Moines, Iowa having a location of 93° west longitude.

As illustrated in FIG. 1, the time disc 16 is set such that the 11 o'clock a.m. symbol is directly opposite the dot 64 in front of the identification symbol 22, which, in this instance, is the numeral 3 representing Des Moines, Iowa. The location of Bangkok, Thailand on the first disc is obtained from the geographic chart 62 and itis it is that the reference symbol 20 is r and the identification symbol 22 for Bangkok, Thailand is 6. Leaving the time disc where it is, the reference symbol r is aligned up with the time disc 16 and, it is noted that the correct time of Bangkok, Thailand is approximately 12 o'clock midnight.

All time problems are worked out just like the above, for Bangkok. There will be no error, although there are corrections due to the fact that some cities sit on the longitudinal line that separates the zones.

To get the longitude of your place, consult the town engineer, or globe or map and school or library and place a check point on the first disc 16 at the equator and work from the check point, and be sure it is a.m. and p.m., as time requires.

Denver and Des Moines are in the same time zone as are the rest of Iowa and about one-tird of Colorado and New Mexico, along with Nebraska, the Dakotas, Minnesota, parts of Wisconsin, Illinois and Mississippi, Manitoba, part of the Northwest Territory (Canada) and part of the North Pole, Kansas, Oklahoma, 99% of Texas, Missouri, Arkansas, Louisiana, most of Mexico, part of Yucatan, Guatamela and the Galapagos Isles, and the Pacific Ocean to the Antartica.

Therefore, as may be readily appreciated, once a reference point is selected and the correct time on the time disc 16 is aligned with the indentification symbol 22 of the reference point, the correct time may be determined at every location identified in the geographic chart 62.

Also, the global time system 10 may be used without consulting the geographic chart 62 in instances when the geographic location for which the time is desired is not listed on the geographic chart 62. All that is required is that the longitude and latitude of the geopraphic location for which the time is to be determined be known. If a reference point for initially setting the time disc 16 is available for the geographic chart 62, then the time disc 16 may be set at the correct time for this first reference point, thereby determining the time for all locations on the first disc 12. Once the time discs 16 is correctly set for the correct time of a reference point, the corresponding position on the first disc 12, according to the longitude and latitude of the geographic location is easily determined. With the position of the time disc 16 fixed, the time for the geographic location may easily be determined by reading the time on the time disc 16 that is directly opposite the longitudinal and latitudinal position of the geographic location.

If the reference point from the geographic chart 62 is not used, any reference point may be used for which the longitude, latitude and the correct time are known. This reference point is then located on the first disc 12 and the time disc 16 is set accordingly. Then, using either the longitude and latitude for the second geographic location or, if applicable, the reference symbol 20 and identification symbol 22 located in the geographical chart, the position of the second geographical location is located on the first disc 12, and the correct time is read from the time disc 16.

Obviously, many modifications and variations of the present invention are possible in light of the above teachings. It is therefore to be understood that, within the scope of the appended claims, the invention may be practiced otherwise than as specifically described.

I claim:

1. A global time system for determining the time at one location on the earth with respect to another location on the earth where the time is known, consisting of:

first disc divided into twenty-four equal sections by twenty-four lines radially extending from the center of said first disc, said lines representing lines of longitude spaced 15° apart, each of said twenty-four sections representing a different time zone;

nine circles concentrically disposed about the center of said first disc in progressively decreasing spaced relationship from the center of said first disc outward, each of said circles representing lines of latitude spaced 10° apart;

a plurality of geographic spaces formed between adjacent line of longitude and latitude, said geographic spaces having a width of 15° longitude and a length of 10° latitude;

a plurality of longitude numbers spaced around said first disc and indicating the respective longitudes of said twenty-four lines;

a time disc rotatably mounted at the center to the center of said first disc, the outside edge thereof having twent-four hour marks thereon, each of said hour marks being equally spaced from each adjacent mark, the marks on each half of said time disc being consecutively numbered from one to twelve for designating the twenty-four hours of the day, said time disc further having twenty-four half-hour marks centered between adjacent hour marks;

a pair of oppositely opposed arrows extending outwardly from the center of said time disc and dividing said time disc in half, one half representing A.M. hours and the other half representing P.M. hours;

said time disc having a darkened portion, one edge of which passes through the center of said time disc and extends perpendicular to said arrows, said darkened portion representing nighttime hours;

said time disc having a lightened portion opposite from said darkened portion and representing daylight hours;

means for rotatably mounting said time disc to said first disc;

twenty-four reference symbols located on said first disc adjacent to the outside edge of said time disc, one of said reference symbols being located in each of said twenty-four sections;

Consecutively numbered identification symbols within each of said twenty-four sections, each identification symbol representing a specific geographic location on the earth within the time zone represented by said section and disposed within said geographic space according to the actual longitude and latitude of the specific geographic location;

a forward dot located in front of said identification symbol for indicating that the geographic location represented by said identification symbol lies in the Northern Hemisphere;

a rearward dot located behind said identification symbol for indicating that the geographic location represented by said identification symbol lies in the Southern Hemisphere; and a geographic chart located at one side of said first disc and listing specific geographic locations arranged by said reference symbols of said twenty-four sections and said consecutively numbered identification symbols.

* * * * *

UNITED STATES PATENT OFFICE
CERTIFICATE OF CORRECTION

Patent No. 4,032,754        Dated June 28, 1977

Inventor(s) Roy R. Ageton

It is certified that error appears in the above-identified patent and that said Letters Patent are hereby corrected as shown below:

In the title, delete "GLOBAL TIME SYSTEM" and substitute --GLOBAL STANDARD TIME SYSTEM--therefor.

Column 1, line 61, delete "fine" and substitute --find-- therefor.

Column 3, line 28, delete "width" and substitute --length-- therefor.

Column 4, line 33, delete "itis it is" and substitute --it is noted--therefor.

Column 6, line 6, delete "twent-four" and substitute --twenty-four--therefor.

Column 6, line 31, delete "Consecutively" and substitute --consecutively--therefor.

Signed and Sealed this

Eighth Day of November 1977

[SEAL]

Attest:

RUTH C. MASON      LUTRELLE F. PARKER
*Attesting Officer*      *Acting Commissioner of Patents and Trademarks*